United States Patent [19]

Takagi

[11] Patent Number: 4,463,918

[45] Date of Patent: Aug. 7, 1984

[54] MAGNETIC RECORDING TAPE CARTRIDGE

[75] Inventor: Hiroyoshi Takagi, Kameoka, Japan

[73] Assignee: Hitachi Maxell, Ltd., Osaka, Japan

[21] Appl. No.: 315,859

[22] Filed: Oct. 28, 1981

[30] Foreign Application Priority Data

Oct. 31, 1980 [JP] Japan .................. 55-156708[U]

[51] Int. Cl.$^3$ .............. G11B 15/43; G11B 23/04; B65H 23/10
[52] U.S. Cl. .................... 242/199; 226/195; 242/75.2; 360/93; 360/132
[58] Field of Search ........... 242/199, 198, 197, 200, 242/192, 194, 76, 75.2, 55.19 A; 360/96.1, 92, 93, 132; 226/146, 147, 151, 195

[56] References Cited

U.S. PATENT DOCUMENTS 3,797,779  3/1974  Esashi et al. ............... 242/199
4,290,567  9/1981  Saito ........................... 242/199 X
4,304,374 12/1981  Okamura et al. ........... 242/199

FOREIGN PATENT DOCUMENTS 2003832  3/1979  United Kingdom .......... 242/199
2057395  4/1981  United Kingdom .......... 242/199

Primary Examiner—Stuart S. Levy
Assistant Examiner—Scott J. Haugland
Attorney, Agent, or Firm—Birch, Stewart, Kolasch & Birch

[57] ABSTRACT

The present invention is directed to a magnetic recording tape cartridge capable of preventing the loosening of a magnetic recording tape comprising a tape adjusting member made of a resilient plate for stretching an intermediate portion of the magnetic recording tape; a pair of wall members formed in the cartridge with a gap defined therebetween to removing or detachably receive the tape adjusting member; and a raised member projected from a main plate portion of the tape adjusting member which is adapted to be engaged with a part of one of the wall members, thereby preventing undesired displacement of the tape adjusting member.

10 Claims, 8 Drawing Figures

MAGNETIC RECORDING TAPE CARTRIDGE

FIELD OF THE INVENTION

The present invention relates to an improvement in a magnetic recording tape cartridge having a tape adjusting member for preventing loosening of the magnetic recording tape.

BACKGROUND OF THE INVENTION

In general, a magnetic recording tape cartridge such as a video tape cartridge has some clearances between the inner surfaces of the cartridge case and a pair of tape reels rotatably contained therein, and since the magnetic recording tape is not constantly strained between the tape reels, the tape tends to be loosened by rotation of the tape reels following vibrations or shock caused during carriage of the cartridges and mounting of the cartridge in a recording/reproducing apparatus.

Such loosening of the magnetic recording tape takes place in positions near the openings formed in the front face of the cartridge case for receiving tape drawing means of a recording/reproducing apparatus for drawing out the magnetic recording tape from the cartridge so as to reproduce the information recorded therein. As a result, there develops problems such as failure in proper drawing of the magnetic recording tape from the openings in the reproducing of the magnetic recording and damage of the magnetic recording tape by the tape drawing means.

For overcoming the aforementioned disadvantages, there has been provided tape adjusting means for preventing loosening or slack of the magnetic recording tape in the cartridge.

In FIG. 1 of the drawings, there is shown an essential part of a conventional magnetic recording tape cartridge having such tape adjusting means.

The magnetic recording tape cartridge comprises a cartridge case 1 formed by top and bottom shells 1a and 1b connected with each other by tapping screws, a pair of tape reels 2 and 2' rotatably arranged within the cartridge case 1 defining small clearances between the same and the inner surfaces of the cartridge case 1 and a magnetic recording tape 3 wound around the tape reels 2 and 2'.

The cartridge case 1 has a plurality of openings 1x in its front side, and a pair of first tape guide members 4 and 4' vertically projecting from the bottom surface 1c of the cartridge case 1 in positions corresponding to the openings 1x for guiding the magnetic recording tape 3. Further, a pair of second tape guide members 5 and 5' are vertically projected from the bottom surface 1c of the cartridge case 1 in positions between the first tape guide members 4 and 4' and the tape reels 2 and 2' respectively so as to guide the magnetic recording tape 3 therealong.

The openings 1x are closed when not in use by a lid member 9 rotatably mounted on the top shell 1a in a known manner. When the magnetic recording tape cartridge is mounted in a recording/reproducing apparatus, these openings can be opened by rotation of the lid member 9.

Such magnetic recording tape 3 is retracted from one of the tape reels and advanced to the other tape reel running along a predetermined path engaging with the respective guide members 4, 4', 5 and 5'.

In close vicinity of the second tape guide members 5 and 5', there are arranged tape adjusting members 6 and 6' for pressing the magnetic recording tape 3 against the second tape guide members 5 and 5' to keep the magnetic recording tape 3 stretched. Each of the tape adjusting members 6 and 6' is fixed at one end thereof by means of an adhesive material, such as adhesive tape, to corresponding vertical wall members 60 and 60' formed on the bottom shell 1b.

However, it has been difficult to uniformly press the magnetic recording tape 3 by the conventional tape adjusting members 6 and 6' since these members 6 and 6' are fixed such as by adhesive tape to the vertical wall members 60 and 60' and tend to be separated from the wall members 60 and 60' by reduction of adhesive force of the adhesive tape. In addition, the adhesive agent from the adhesive tape undesirably reaches the free end of the tape adjusting members, thereby sticking to the magnetic recording tape resulting in the unstable running of the magnetic recording tape and strains on the tape. Further, in a manufacturing process, it takes time to align the adjusting members 6 and 6' at a desired position and stick the same to the vertical wall members 60 and 60' in the narrow spaces leading to inferior workability in assembling of the cartridge. Thus, the conventional tape adjusting members 6 and 6' must be assembled in the cartridge case manually, thereby preventing automatic assembling of the magnetic recording tape cartridge.

SUMMARY OF THE INVENTION

The present invention contemplates a technique to overcome the aforementioned disadvantages being inherent in the conventional tape slack preventing device as described above by providing a magnetic recording tape cartridge having a tape-slack preventing device in which tape adjusting members can be easily and securely fixed to and supported by the bottom shell of a cartridge case by merely inserting the tape adjusting members vertically into predetermined positions of the bottom shell.

DESCRIPTION OF A PREFERRED EMBODIMENT

Figure 1:
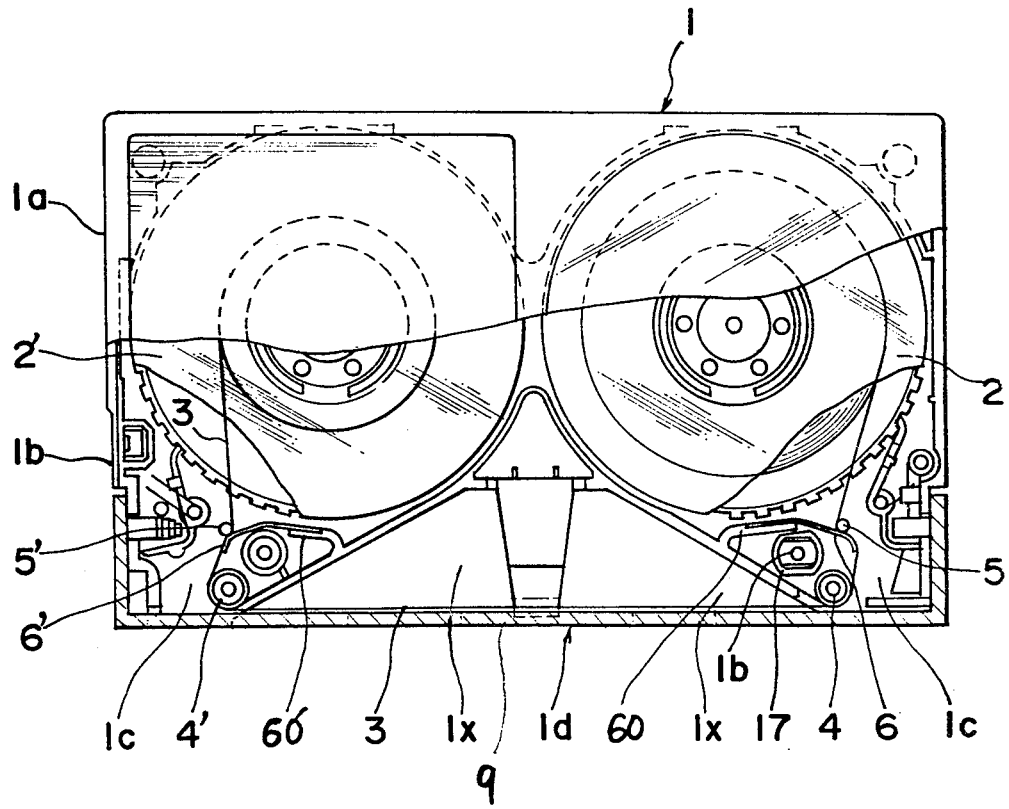
FIG. 1 is a top plan view of a conventional magnetic recording tape cartridge with the top shell partially omitted.

The present invention will be hereinafter fully described in conjunction with a preferred embodiment of a magnetic recording tape cartridge having a tape-slack preventing device. Before the description proceeds, it is noted that in FIGS. 2 to 8, like parts in FIG. 1 are defined by the same reference numerals, and the detailed description thereof is omitted.

Figure 2:
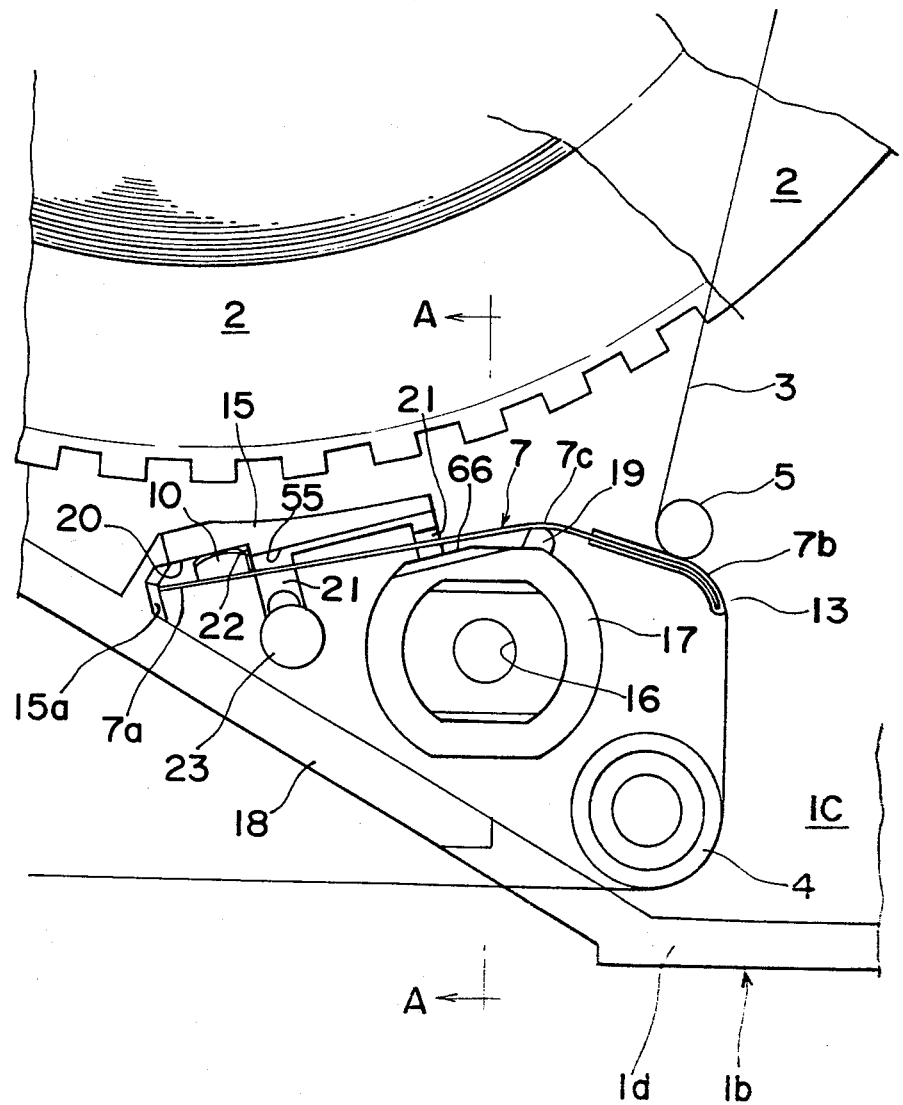
FIG. 2 is an enlarged top plan view of an essential part of one embodiment of the tape slack preventing device according to the present invention with a lid member omitted.
Figure 4:
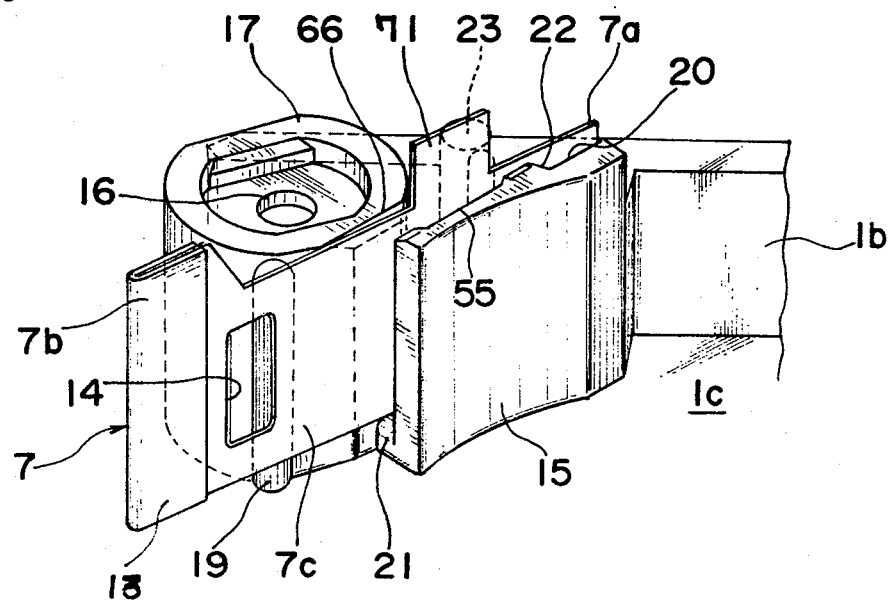
FIG. 4 is a perspective view showing the condition of assembling of the tape adjusting member of the present invention.
Figure 6:
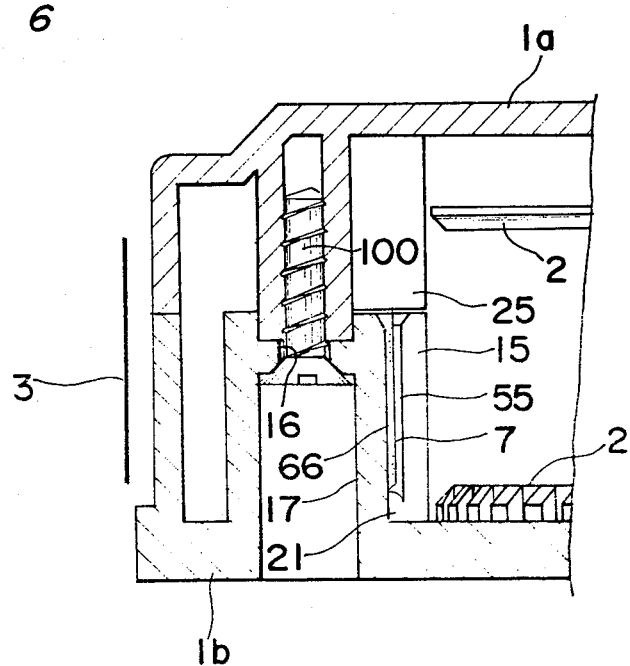
FIG. 6 is a cross sectional view taken along the line A—A in FIG. 2.

Referring now to FIGS. 2, 4 and 6, a tape adjusting member 7 is made of a pliable hard flat sheet of plastic such as a polyester or polyethylene formed by way of a punching process. The tape adjusting member 7 has a generally cross configuration comprising a lateral main plate member 70, an upper projected portion 71 and a lower projected portion 72. In one end portion 7a of the tape adjusting member 7, there is formed a raised portion 10 raised from the main plate 70 to provide a free end portion 10a at the top end portion thereof.

The raised member can be formed, for example, by a punching method.

The forward end or free end portion 7b of the tape adjusting member 7 defines a rectangular contact member which is larger in width than the magnetic recording tape 3 for being in sliding contact with the magnetic recording tape 3, and the surface of the plastic sheet in this portion is coated by a smooth material 13 such as a sheet of polytetrafluoroethylene so as to prevent damage of the magnetic recording tape 3 and to reduce friction resistance in case of sliding contact with the magnetic recording tape 3.

The tape adjusting member 7 further has a through-hole 14 in its intermediate portion 7c near the free end portion 7b.

As shown in FIG. 2, the bottom shell 1b is provided therein with a wall 15 for restricting displacement of a tape reel 2 in a radial direction of the tape reel in the vicinity of a first tape guide member 5 and a tapping screw 100 which is inserted from below the bottom shell 1b through a hole 16 of a boss 17 formed in the bottom shell 1b for connecting top and bottom shells 1a and 1b with each other. The boss 17 is positioned between the first tape guide member 5 and the reel restriction wall 15.

Figure 5:
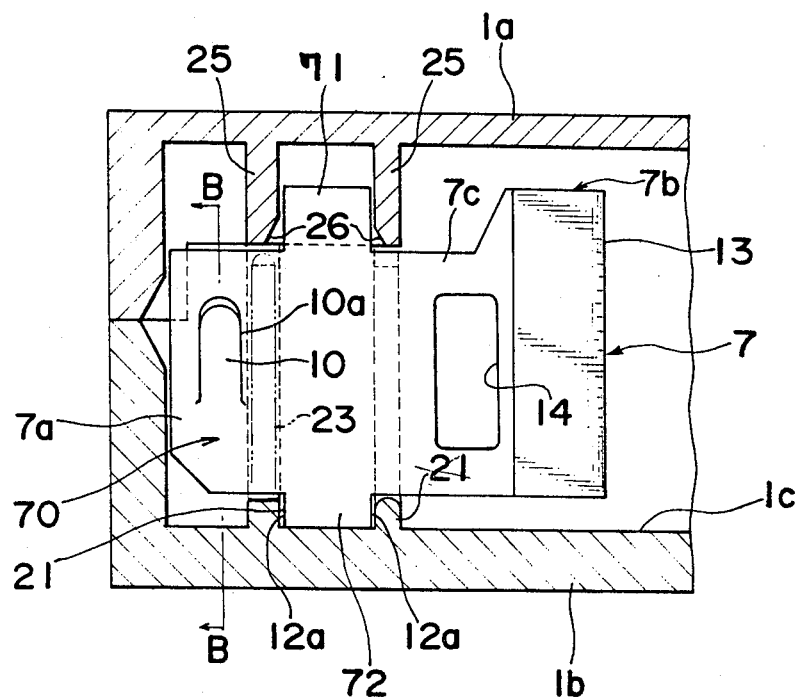
FIG. 5 is a vertical cross sectional view of FIG. 4.

The wall 15 extends along the peripheral edge of the tape reel 2 up to the position between the tape reel 2 and the boss 17, from a partition wall 18 which extends slantingly from the front face 1d to a central portion of the tape cartridge 1. In this embodiment, the reel restriction wall 15 has a height higher than the height of the bottom shell 1b as shown in FIG. 5. At the intermediate of the reel restriction wall 15, there is formed a first supporting wall 55 projecting generally frontwardly, i.e., in a direction of the front face 1d so as to provide an engaging member with the raised member 10 of the tape adjusting member 7 when the tape adjusting member 7 is set in position as explained hereinafter.

Opposite to the first supporting wall 55, a column like pin 23 is projected from the bottom shell 1b, the purpose of which will be described hereinafter.

A second support wall 66 is formed on the outer surface of the boss 17 opposite to the end portion of the reel restriction wall 15. The second support wall 66 has a flat plane which is generally parallel with the reel restriction wall 15.

A shallow slot 21 is formed in the bottom shell 1b between the first supporting wall 55 and the pin 23 to receive the lower projected portion 72 of the tape adjusting member 7.

Between the first and second supporting walls 55 and 66, there is defined a clearance having sufficient width and height for receiving the tape adjusting member 7.

The tape adjusting member 7 is inserted between the second tape guide member 5 and the first and second supporting walls 55 and 66 vertically from above in such a manner that the raised member 10 is positioned in a space between the first supporting wall 55 and a connecting wall 15a with the free end 10a of the raised member 10 being directed upward opposing the reel restriction wall 15, then pushing the tape adjusting member downwardly locating the lower projected portion 72 in the slot 21. In this condition, a vertical projection 19 formed on the peripheral surface of the boss 17 in the vicinity of the second supporting wall 66 comes in contact with the middle portion 7c of the tape adjusting member 7 so as to bend the middle portion 7c in a V-shape in plan view, and the one end portion 7a of the tape adjusting member 7 is rotated towards the reel restriction wall 15 about the middle portion 7c and the severed end of the raised member 10 comes in contact with a contact surface 22 of the first supporting wall 55. As the severed end of the raised member 10 projecting from the one end portion 7a is thus in contact with the contact surface 22, the free end 7b of the tape adjusting member supported in a cantilever manner is not inclined or depressed in a downward direction, i.e., toward the bottom shell 1b even if the one end portion 7a thereof tends to be raised by the weight of the free end portion 7b. Since the tape adjusting member 7 is formed by a pliable sheet and has suitable hardness, the one end portion 7a opposing to the supporting wall 55 is moved towards the reel restriction wall 15, when the free end 7b of the tape adjusting member is in contact with the magnetic recording tape 3 as shown in FIG. 2. However, since the raised member 10 of the tape adjusting member 7 is so situated as to oppose the reel restriction wall 15 with the upper free end of the raised member 10 resiliently abutted onto the wall 15, the tape adjusting member 7 is securely fixed on the bottom shell 1b.

In addition, since the raised member 10 projects upwardly, the tape adjusting member 7 can be smoothly inserted between the first and second supporting walls 55 and 66 to be securely held therebetween by the elasticity of the raise member 10.

By provision of the through-hole 14, the middle portion 7c can be easily bent when the same is in contact with the fulcrum 19 of the tape adjusting member 7 and the tape adjusting member 7 is prevented from torsional deformation because the upper and lower ends thereof remain connected with each other, and further, flexibility at the fulcrum of bending can be controlled by making the through-hole 14 in an elongated form as shown in FIGS. 4 and 5, increasing or decreasing the size thereof.

The raised member 10 may be formed on either side of the base portion of the adjusting member 7, and is preferably projected in a direction opposite to the bending direction of the adjusting member 7 so that the adjusting member 7 is securely and firmly supported by the bottom shell 1b.

Further, by projecting the raised member 10 toward the upper portion of the magnetic recording tape cartridge, it can be easily mounted on the bottom shell 1b.

It is to be noted that the pin 23 is not in contact with the base portion of the tape adjusting member 7, but functions to prevent the one end portion 7a from being separated from the first supporting wall 55 and largely displaced when and after assembling of the magnetic recording tape cartridge.

Figure 3:
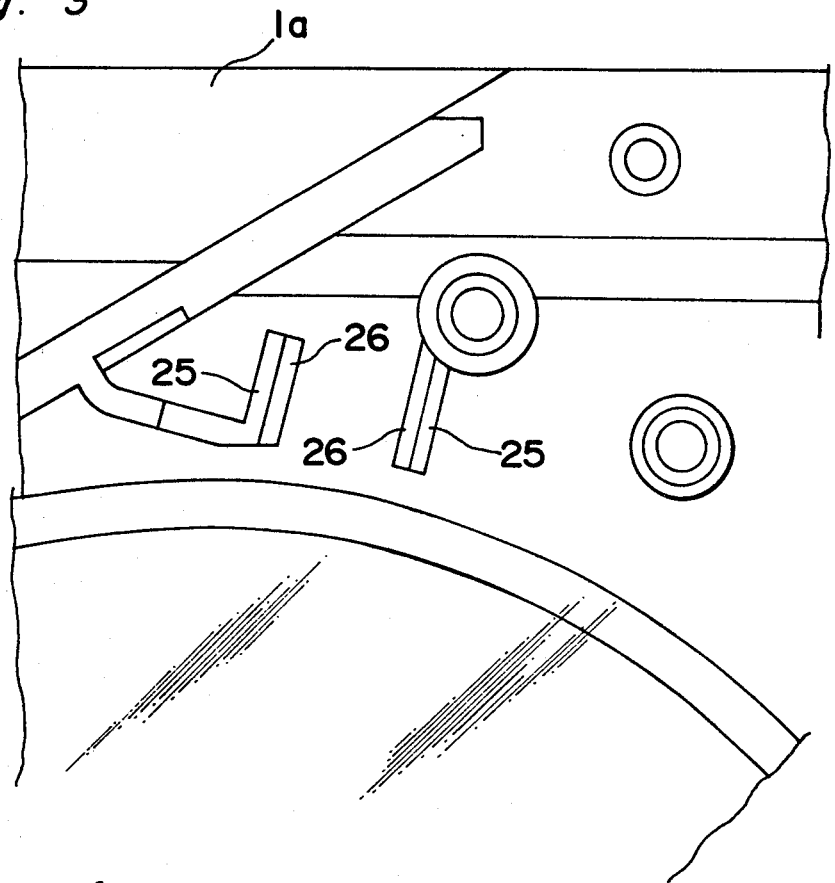
FIG. 3 is an enlarged top plan view of an essential part of the tape slack preventing device of FIG. 2 showing the interior of a top shell.

The tape adjusting member 7 inserted into and mounted to the bottom shell 1b in the aforementioned manner is neither disengaged from the bottom shell 1b, nor displaced, in addition, the free end portion 7b is prevented from falling down from a desired position even when exposed to vibrations and impacts that might be caused by assembling of the bottom shell 1b with other components, and after the top and bottom shells 1a and 1b are finally assembled together by screws, the one end portion 7a of the tape adjusting member 7 is more firmly supported by the top and bottom shells 1a and 1b in a cantilever manner. That is, as shown in FIG. 3, the top shell 1a has in its inner surface pair of ribs 25 for receiving the upper projection 71 of the tape adjusting member 7. The ribs 25 thus hold the upper end of the tape adjusting member 7 to restrict raising thereof and prevent the tape adjusting member 7 from inclining toward the forward end after assembling. The lower ends of the ribs 25 define opposite tapered surfaces 26 so as to be in contact with the upper projection 71 of the tape adjusting member 7 for correcting the position of the tape adjusting member 7 if the same is displaced in the longitudinal direction when the top shell 1a is connected to the bottom shell 1b.

Figure 7:
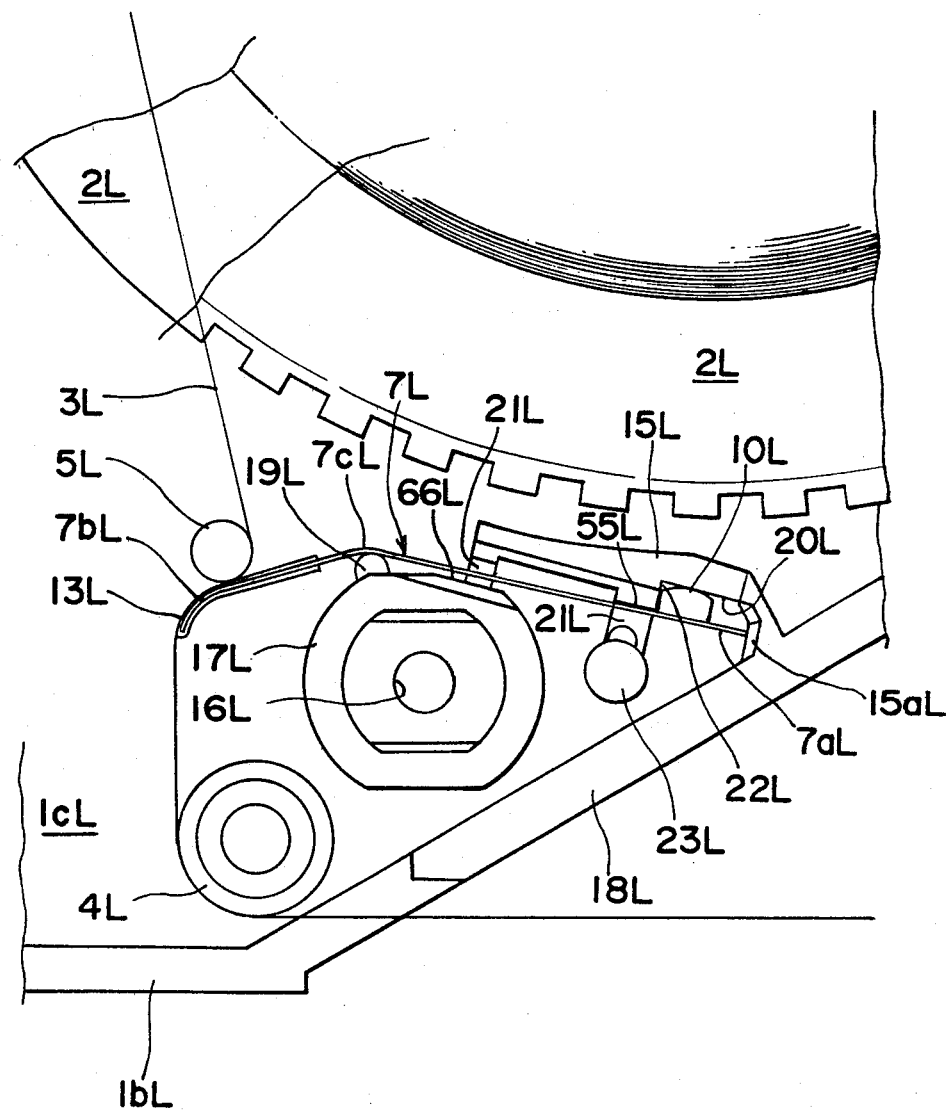
FIG. 7 is an enlarged top plan view of an essential part of the tape slack preventing device for use in the left-side portion of a magnetic recording tape cartridge with a lid member omitted.
Figure 8:
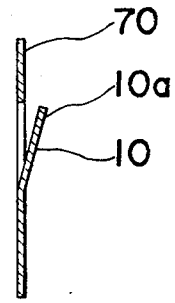
FIG. 8 is a cross-sectional view of a tape adjusting member taken along the line B—B in FIG. 5.

Another arrangement of the tape adjusting member as shown in FIGS. 2 to 6 is provided in the left side corner of the cartridge case 1, wherein various components shown in FIG. 2 are formed symmetrical as shown in FIG. 7. In FIG. 7, like parts in FIG. 2 are designated by like reference numerals with character L attached. Thus, when both of the tape adjusting members are mounted in the bottom shell 1b as described above, and the magnetic recording tape 3 is loaded between the pair of tape reels 2 and 2' with the guide pins 5 and the guide rollers 4 engaged with the recording tape 3, the magnetic recording tape 3 is stretched by the resilient force applied from the free ends of both of the tape adjusting members 7.

Although in the embodiment as described above, the arrangements of the tape adjusting member are provided on the left and right corners of the cartridge case, one of them may be omitted.

Further, the second tape guide member 5, as shown in the embodiment is merely an example of tape guide members to be used, for which a tape guide roller or a pin integrally provided in the bottom shell 1b may be utilized.

In this embodiment, an existing wall for restricting free movement of the tape reel 2 is utilized as the first supporting wall 55 and an existing boss 17 having the through-hole 16 is utilized as the second supporting wall 66, though, they may be replaced by round pins integrally formed in the bottom shell 1b.

As hereinabove described, the first and second supporting walls 55 and 66 of the present invention are arranged in a predetermined positional relationship with respect to the second tape guide member 5, between which the tape adjusting member 7 is inserted from the upper direction so that the middle portion 7c of the tape adjusting member 7 is in contact with the vertical projection 19 to be bent and the tape adjusting member 7 is fixed by elastic force of the tape adjusting member 7 and the raised member 10 provided in the tape adjusting member while the free end 7b of the tape adjusting member is pressed against the second tape guide member 5 holding the magnetic recording tape 3 therebetween.

Since the raised member 10 projecting from the tape adjusting member 7 is in contact with the contact surface 22 of the wall 15, the tape adjusting member 7 is prevented from inclining by the engagement between the contact surface 22 and the raised member 10 even if the tape adjusting member 7 tends to be raised up by the weight of the free end thereof.

By virtue of the aforementioned construction, the tape adjusting member 7 can be easily mounted in the cartridge case by insertion in a predetermined position, thereby improving workability in assembling thereof and enabling automatic manufacturing thereof. Furthermore, it is advantageous that by forming the tape adjusting member of a hard plate having a suitable elasticity with the raised portion 10 resiliently projected therefrom, whereby when the tape adjusting member 7 is placed in position, the severed edge of the raised member 10 can be firmly engaged with the face 22 of the wall member 15 with the upper free end portion of the raised member 10 resiliently pressed onto the face 20 of the wall member 15, thus the tape adjusting member 7 can be easily and surely placed in position without undesired displacement, even if the magnetic recording tape cartridge is exposed to vibrations and impacts during assembling of the bottom shell 1b with other component parts. After the top and bottom shells 1a and 1b are assembled together, the tape adjusting member 7 is absolutely prevented from displacement and inclination.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording tape cartridge comprising:
   a bottom shell and a top shell assembled together to provide a cartridge case;
   a magnetic recording tape directed along a predetermined path having two ends wound around a pair of tape reels accommodated in said cartridge case, each of said ends of said recording tape being engaged with said tape reels, said tape having an intermediate portion;
   a pair of first tape guide members vertically provided on the upper surface of said bottom shell in positions near the front face of said cartridge case for guiding said magnetic recording tape;
   a tape adjusting member comprising a resilient plate having a main portion with a free end provided to contact said magnetic recording tape; and
   a pair of first and second opposing supporting wall members formed on said bottom shell having a gap defined therebetween, said first wall member having a step portion defining a lower portion and upper portion in said wall member directed toward said gap, said gap being provided to removably receive said main plate portion of said tape adjusting member with a vertical attitude, said free end of said tape adjusting member being situated so as to press said magnetic recording tape against one of said first tape guide members, said tape adjusting member being provided with a raised tongue portion projected from said main plate portion of said tape adjusting member toward said wall member having said step portion provided therein, said raised tongue portion being engaged with a face of the lower portion of said step portion of said wall member when said tape adjusting member is in position between said wall members, with one vertical edge of said tongue member being engaged with a corresponding vertical face of said upper portion of said step portion of the respective wall member, thereby securing said tape adjusting member in said tape cartridge.

2. The magnetic recording tape cartridge according to claim 1, wherein said free end portion of said tape adjusting member has a width larger than the width of said magnetic recording tape.

3. The magnetic recording tape cartridge according to claim 1, wherein said tongue member of said tape adjusting member protrudes in a direction opposite to the direction of bending of said tape adjusting member.

4. The magnetic recording tape cartridge according to claim 1, wherein a through-hole is formed in a central portion of said tape adjusting member said central portion thereby providing the fulcrum of bending of said tape adjusting member.

5. The magnetic recording tape cartridge according to claim 1, having second tape guide members wherein said free end of said tape adjusting member is in contact with said magnetic recording tape in a position between at least one of said first tape guide members and said second tape guide members.

6. The magnetic recording tape cartridge according to claim 1, wherein said wall member comprising said stepped portion serves as a reel restriction wall extending between a part of the corresponding tape reel and said tape adjusting member and the other of said wall members being formed on a peripheral surface of a boss for receiving a tapping screw for connecting the bottom shell and the top shell.

7. The magnetic recording tape cartridge according to claim 1, wherein said tape adjusting member has a generally cross configuration comprising a main plate portion and top and bottom projected portions projected from the intermediate portion of the main plate, each of said projected portions being fitted in corresponding recesses formed in the top shell and the bottom shell so as to further secure said tape adjusting member in position.

8. The magnetic recording tape cartridge according to claim 1, further comprising a rib projected vertically from said bottom shell for engaging with one surface of said tape adjusting member to define a bent portion of said tape adjusting member when the free end of the tape adjusting member is in contact with said magnetic recording tape.

9. The magnetic recording tape cartridge according to claim 8, wherein said rib is formed on an outer peripheral surface of a boss projected from said bottom shell for receiving a tapping screw for assembling said bottom shell and said top shell.

10. The magnetic recording tape cartridge according to claim 9, wherein said second wall member is formed on said boss opposite said first wall member.

* * * * *